(12) United States Patent
Porter

(10) Patent No.: US 7,356,806 B2
(45) Date of Patent: *Apr. 8, 2008

(54) METHOD AND SYSTEM FOR PROCESSING RECORDS OF EVENTS DURING USE OF A COMMUNICATIONS SYSTEM

(75) Inventor: Kelvin R. Porter, Dallas, TX (US)

(73) Assignee: Verizon Business Global LLC, Basking Ridge, NJ (US)

( * ) Notice: Subject to any disclaimer, the term of this patent is extended or adjusted under 35 U.S.C. 154(b) by 775 days.

This patent is subject to a terminal disclaimer.

(21) Appl. No.: 10/798,151

(22) Filed: Mar. 11, 2004

(65) Prior Publication Data

US 2004/0172471 A1    Sep. 2, 2004

Related U.S. Application Data

(63) Continuation of application No. 09/464,647, filed on Dec. 15, 1999, now Pat. No. 6,714,978.

(60) Provisional application No. 60/169,043, filed on Dec. 4, 1999.

(51) Int. Cl.
*G06F 9/44* (2006.01)
*G06F 9/45* (2006.01)

(52) U.S. Cl. ........................ 717/130; 717/145

(58) Field of Classification Search ........ 709/200–300; 712/241, 218; 717/130, 145
See application file for complete search history.

(56) References Cited

U.S. PATENT DOCUMENTS

| | | | |
|---|---|---|---|
| 4,785,408 A | 11/1988 | Britton et al. | |
| 5,311,572 A | 5/1994 | Friedes et al. | |
| 5,323,452 A | 6/1994 | Dickman et al. | |
| 5,442,690 A | 8/1995 | Nazif et al. | |
| 5,448,631 A | 9/1995 | Cain | |

(Continued)

FOREIGN PATENT DOCUMENTS

EP    0 770 965    5/1997

(Continued)

OTHER PUBLICATIONS

Gritzalix, et al., "Security Issues Surrounding Programming Languages for Mobile Code: *JAVA* vs. *Sate-Tel*", IEEE, pp. 16-22.

*Primary Examiner*—Krisna Lim

(57) ABSTRACT

In a communications network that provides services to a plurality of users, events occurring during service processing are accumulated in an event record and sent to a record processor to perform post-processing, such as assessing charges to be billed to users of the network. Each service processing node in the communications network accumulates event records, bundles them with instructions as to how they are be processed, and dispatches them to one or more record processors. Before being sent to a record processor, an event record is augmented with instructions describing how to perform processing upon the events in the event record. The record processors are general-purpose processors and the instructions for post-processing are carried within the event records themselves. Post-processors are no longer required to be dedicated to a particular purpose such as billing computation. Furthermore, deployment of post-processing function is more timely and can be integrated with deployment of service processing functions to network service processors.

20 Claims, 11 Drawing Sheets

U.S. PATENT DOCUMENTS

| | | | |
|---|---|---|---|
| 5,526,484 A * | 6/1996 | Casper et al. ............... 709/237 |
| 5,537,466 A | 7/1996 | Taylor et al. |
| 5,586,177 A | 12/1996 | Farris et al. |
| 5,691,777 A | 11/1997 | Kassatly |
| 5,724,584 A | 3/1998 | Peters et al. |
| 5,727,194 A * | 3/1998 | Shridhar et al. ............ 712/241 |
| 5,740,231 A | 4/1998 | Cohn et al. |
| 5,790,861 A * | 8/1998 | Rose et al. ................. 717/145 |
| 5,802,288 A * | 9/1998 | Ekanadham et al. ........ 709/250 |
| 5,815,559 A | 9/1998 | Schnable |
| 5,835,497 A | 11/1998 | Litzenberger et al. |
| 5,881,134 A | 3/1999 | Foster et al. |
| 5,892,950 A | 4/1999 | Rigori et al. |
| 5,915,008 A | 6/1999 | Dulman |
| 5,935,242 A | 8/1999 | Madany et al. |
| 5,956,690 A | 9/1999 | Haggerson et al. |
| 5,958,016 A | 9/1999 | Chang et al. |
| 5,966,434 A | 10/1999 | Schafer et al. |
| 5,974,538 A * | 10/1999 | Wilmot, II .................. 712/218 |
| 5,978,854 A | 11/1999 | Fujimori et al. |
| 5,991,803 A | 11/1999 | Glitho et al. |
| 5,995,946 A | 11/1999 | Auzenne et al. |
| 5,996,024 A | 11/1999 | Blumenau |
| 6,009,247 A | 12/1999 | Canora et al. |
| 6,038,309 A | 3/2000 | Ram et al. |
| 6,038,548 A | 3/2000 | Kamil |
| 6,061,717 A | 5/2000 | Carleton et al. |
| 6,118,940 A | 9/2000 | Alexander et al. |
| 6,131,095 A | 10/2000 | Low et al. |
| 6,161,128 A | 12/2000 | Smyk |
| 6,226,665 B1 | 5/2001 | Deo et al. |
| 6,230,160 B1 | 5/2001 | Chan et al. |
| 6,314,172 B1 | 11/2001 | Nightingale |
| 6,363,411 B1 | 3/2002 | Dugan et al. |
| 6,385,301 B1 | 5/2002 | Nolting et al. |
| 6,396,913 B1 | 5/2002 | Perkins, III |
| 6,405,099 B1 | 6/2002 | Nagai et al. |
| 6,411,697 B1 | 6/2002 | Creamer et al. |
| 6,425,005 B1 | 7/2002 | Dugan et al. |
| 6,442,663 B1 | 8/2002 | Sun et al. |
| 6,446,123 B1 | 9/2002 | Ballantine et al. |
| 6,463,138 B1 | 10/2002 | Sherwood et al. |
| 6,502,133 B1 | 12/2002 | Baulier et al. |
| 6,546,420 B1 | 4/2003 | Lemler et al. |
| 6,594,355 B1 | 7/2003 | Deo et al. |
| 6,687,355 B1 * | 2/2004 | Porter ................... 379/201.03 |
| 7,013,456 B1 * | 3/2006 | Van Dyke et al. .......... 717/130 |
| 2001/0028654 A1 | 10/2001 | Anjum et al. |
| 2001/0055492 A1 | 12/2001 | Wood et al. |
| 2002/0083166 A1 | 6/2002 | Dugan et al. |
| 2002/0107944 A1 | 8/2002 | Bai et al. |
| 2002/0120624 A1 | 8/2002 | Givoly et al. |
| 2002/0161726 A1 | 10/2002 | Stahl et al. |

FOREIGN PATENT DOCUMENTS

| | | |
|---|---|---|
| WO | 98/33302 | 7/1998 |

* cited by examiner

METHOD AND SYSTEM FOR PROCESSING RECORDS OF EVENTS DURING USE OF A COMMUNICATIONS SYSTEM

RELATED APPLICATIONS

This patent application is a continuation of U.S. patent application Ser. No. 09/464,647, filed Dec. 15, 1999, entitled "METHOD AND SYSTEM FOR PROCESSING RECORDS IN A COMMUNICATIONS NETWORK," which claims benefit of priority to U.S. Provisional Application No. 60/169,043, filed Dec. 4, 1999, both of which are incorporated herein by reference.

FIELD OF THE INVENTION

The present invention is related to communications networks and, in particular, to a new method for processing a record of events recorded during use of the communications network.

BACKGROUND

In a traditional revenue-bearing communications network, such as the public switched telephone network (PSTN), a network owner or "service provider" assesses charges to each user or "service subscriber." Subscribers pay for accessing and using the network and the charges assessed may be based upon a fixed fee, distance and duration of a connection, amount of data transferred, use of special services, etc.

To measure usage by each subscriber, various points in the network may keep a record of connections or data flow through the network on behalf of each subscriber. For example, in a telephone network, the switches that route calls keep a record of each call handled. For practical reasons, these records have traditionally been stored locally at each switch and periodically collected to do billing processing. The records are also used for deriving traffic statistics and for detecting patterns of fraudulent use.

Because a given connection, such as a long-distance telephone call, may involve several switches, several separate call records will be generated in the course of handling the call. During billing processing, these records must be sorted out from the millions of other records collected from all the switches in the network. The correlated records are then assembled to give a composite description of what network resources were used during the particular call and accordingly what charges are to be billed to the appropriate subscribers.

The software that controls each switch is designed to record selected events that occur during call processing and to encode these events into a very specific format. The traditional method of encoding events is known as Automatic Message Accounting (AMA) and is described in an industry standards document designated GR-1100-CORE which may be obtained from Telcordia Technologies. In summary, the encoding format is a well-defined static data structure, also referred to in the industry as a Call Detail Record (CDR). Individual call records are bundled into blocks, which the switch writes to magnetic tapes or other forms of persistent storage.

After collecting the call records from a network that have accumulated over a period of time, a billing processing system must decode and interpret the significance of the content of billing records as encoded by the switches and other network elements. To assure accurate billing processing, the syntax and semantics of the CDR must be commonly understood by both the network elements that generate records and the processing systems that interpret the records.

Software in the billing processor is designed to parse and process call records assuming a particular structure and content. Any change to the CDR semantics or syntax requires a change in the billing code. This change may be necessitated by introduction of a new billable service or feature. For example, the introduction of new service that allows billing a toll telephone call to a debit card or to a third party requires new information be encoded in the CDR.

In the telephone network of the past, new services were introduced relatively infrequently. Reducing time-to-market was not a high priority for service providers. More recently, however, competition among service providers and availability of new capabilities, driven by subscriber demand, have accelerated the introduction of new features.

The burden of changing billing systems code hinders the introduction of new features in a communications network. The traditional fixed-length CDR is relatively inflexible and unnecessarily confining. Since the time that the CDR was first introduced, communications bandwidths and processing speeds have improved many-fold, obviating the need to keep the CDR compact. Many advantages can now be realized in departing from the traditional CDR format.

Accordingly, what is required is an improved method for collecting, conveying and processing recorded event information in a communications network that does not require extensive rewriting and testing of billing systems software whenever a new billable feature is added to the network. This requirement is generally applicable to any records resulting from providing communications service that need to be processed for whatever reason, whether it be billing, fraud detection, traffic analysis, etc.

Technologies are currently being implemented whereby a single communications network may offer users a variety of traffic types, bandwidths, transport technologies and special services. Accordingly, there is a need for generic and readily extensible post-processing systems to cooperatively function with communications systems.

There is also incidentally a need for more general terminology to characterize such communications and post-processing systems. Though the concepts and terminology of a "call" and of "call processing" have long been applied in the context of a traditional telephone network, the broader terms of a "session" and of "service processing" are more appropriate to encompass all uses of a more modern network. A "session" as used herein refers to an instance of use of the network and may comprise the delivery of a single data packet, the establishment of a temporary two-way voice channel, or the transport of a large multimedia file, to name a few examples. The term "service processing" generally refers to the decisions made and actions performed by the network to fulfill the needs of network users.

SUMMARY OF THE INVENTION

The present invention is directed to a method for creating and manipulating service processing records in a communications network wherein a service processing record comprises instructions for interpreting the recorded data described in the record. As used herein, the term "instructions" refers generally to a codification of how something is to be handled. Instructions may take the form of, for example, executable code, pseudo-code, source code, scripting or mark-up language, a simple data structure, or a mixture thereof. Where the term "methods" is used below for clarity to describe processing instructions that are conveyed within a service processing record, it should be understood that the more general concept of "instructions" that affect record processing is equally applicable in each instance.

In accordance with a preferred embodiment of the present invention, a processing record comprises instructions in the form of executable code for interpreting the recorded data described in the record.

In accordance with another aspect, the present invention is directed to a method whereby service processing records are created, accumulated, and packaged with appropriate functionality, then forwarded to a billing processing system based upon an arbitrary bundling and dispatching policy.

In accordance with a preferred embodiment of the present invention, service processing records conform to a prescribed executable format, such as a JAVA executable. (JAVA is a registered trademark of Sun Microsystems.)

Service processing records may be originated by any network element or service processing function in a communications network. Service processing records may be associated with connections, sessions, or other transactions involving the network. Aside from assessing charges to be billed to subscribers, service processing records may also be processed to identify fraud patterns, analyze consumer trends, and facilitate network capacity engineering. Each service processing record comprises service processing event data and, according to the present invention, may further comprise instructions, such as methods or callable functions, for interpreting and processing the service processing event data.

Service processing records in accordance with the present invention are packaged as executable code, wherein methods are encoded as callable functions and events are encoded as calls to those functions using parameters relevant to the specific instances of the events.

A service processing record of this type may be processed by a general-purpose processing system that extracts the functional content from the record and then uses the methods to interpret and process the data in the record. Whenever a new service or billable feature is added to a network, new or modified service processing functions are deployed to network elements, such as switches and routers, throughout the network. When service processing functions are upgraded with new capabilities, certain portions of the service processing functions that generate service processing records can be designed to include billing and other post-processing methods into the service processing records that are subsequently generated and dispatched. Thus, billing functionality is produced and distributed along with the service processing functionality. In other words, this approach allows the creation and deployment of billing function to be integral with that of service processing functions.

In contrast to prior art record processing systems that use dedicated-purpose hardware and software, event records generated in accordance with the present invention may be handled by a general-purpose post-processing system that extracts the instructions from the service processing event records and then uses the instructions for processing the recorded events. Changes to billing function are created and distributed at the same time as service function. Therefore, billing function need not be maintained and tested separately from service functions. This results in faster implementation of new services in a communications network.

As described earlier, a service processing record as conveyed to a record processor comprises instructions that affect how event data is interpreted and processed in the record processor. Although the prior art call detail records included multiple data fields that were interpreted in context of one another, the methods by which the multiple data fields were processed in context with one another were entirely fixed within the software and hardware of the record processor. Consequently, the semantics of the data fields in the prior art CDR were established by convention. In contrast, the present invention permits data fields to be dynamically re-purposed based on other content in the record and as decided by logic operating outside of the record processor. In fact, the present invention even allows a record processor to be re-purposed merely by the instruction content of the service processing record. A given general-purpose record processor may indeed have no intrinsic ability to process events within service processing records aside from the instructions conveyed within the service processing records themselves.

DESCRIPTION OF THE DRAWINGS

The foregoing and other features and advantages of the invention are described in detail below with reference to the accompanying drawings, wherein.

DETAILED DESCRIPTION

The present invention is directed to a system and method for processing the event records generated by a communications network. In accordance with a preferred embodiment of the present invention, the event records are processed by general-purpose record processors and the methods for performing such processing are conveyed within the event records themselves.

The following description details how deployment and execution of record processing methods can occur in this manner.

Figure 1:
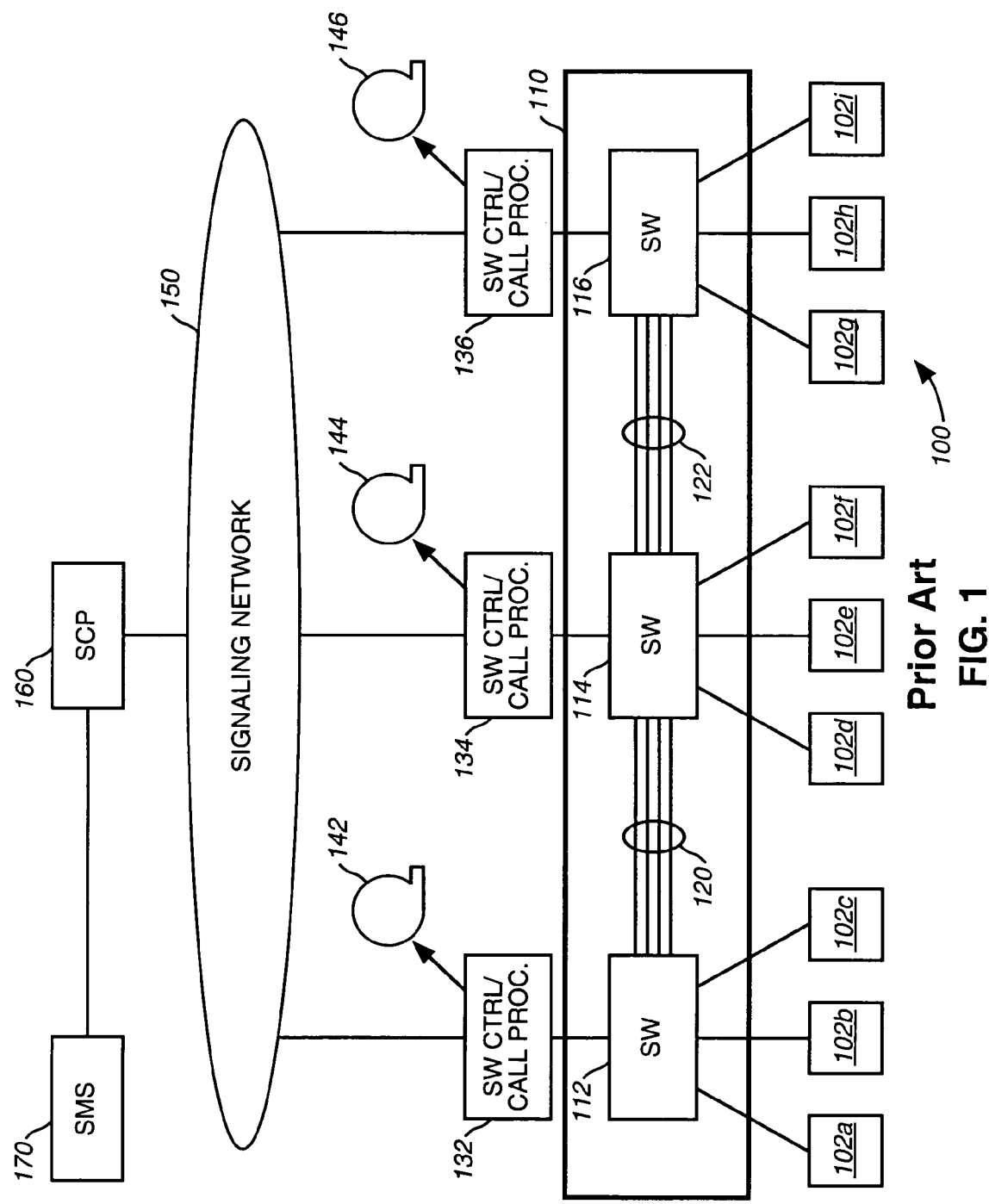
FIG. 1 is diagram of a prior art communications network showing how call detail records emanate from switching sites in the network.

Referring to FIG. 1 of the drawings, a communications network 100 is shown to comprise switches 112, 114 and 116 interconnected by groups of communications links 120 and 122, sometimes referred to as "trunks." This collection of switches and links is said to constitute a traffic-bearing network 110. In the example of FIG. 1, traffic-bearing network 110 serves to transport information among various subscriber locations 102a-102i.

The actions of switches 112, 114 and 116 in network 110 need to be coordinated to route data or otherwise connect subscribers. Accordingly, a switch controller/call processor 132 is coupled so as to control switch 112. Whereas switch 112 directly handles subscriber traffic, switch controller/call processor 132 directs switch 112 to make connections among specific ports. In some practical implementations, some or all of the functional pieces of switch controller/call processor 132 are integrated or collocated with switch 112.

Likewise, switches 114 and 116 in FIG. 1 are controlled by switch controller/call processors 134 and 136, respectively.

Each of the switch controller/call processors in FIG. 1 are connected to a packet-switched signaling network 150 which is, in turn, coupled to at least one service control point 160.

Through signaling network 150, switch controllers 132, 134, and 136 may communicate among one another using, for example, Common Channel Signaling System #7 (SS7). Moreover, switch controllers 132, 134 and 136 may access service control point 160 to determine how to route a given traffic demand. In a typical telephone network, SCP 160 commonly includes a database for performing number translations, such as mapping of 1-800 number telephone calls to actual destination numbers. Service control point 160 maintains data that affects how traffic-bearing network 110 fulfills subscriber requests.

As shown in FIG. 1, a service management system (SMS) 170 is coupled for downloading service-controlling data into SCP 160. In a typical intelligent network as shown in FIG. 1, the software instructions that determine the behavior of the switches and call processors are "built-in" or manually loaded into the equipment. There is no mechanism for distributing actual operating software to these elements via SMS 170 or SCP 160. Instead, limited control of the operation of network 100 is exercised by changing the content of data tables at SCP 160. One aspect of the software that controls switch controller/call processor 132 creates records incidental to call processing. These records contain information about instances of usage by subscribers and are commonly used to calculate the amount that each subscriber must pay for their usage of the network, usually over a given period of time. These records are accumulated into a call detail record file 142.

likewise, switch controller/call processors 134 and 136 accumulate call detail record files 144 and 146, respectively.

Because the elements that generate call detail records are usually located a considerable distance apart, separate call detail record files are accumulated at each site and then periodically collected to be processed.

Figure 2:
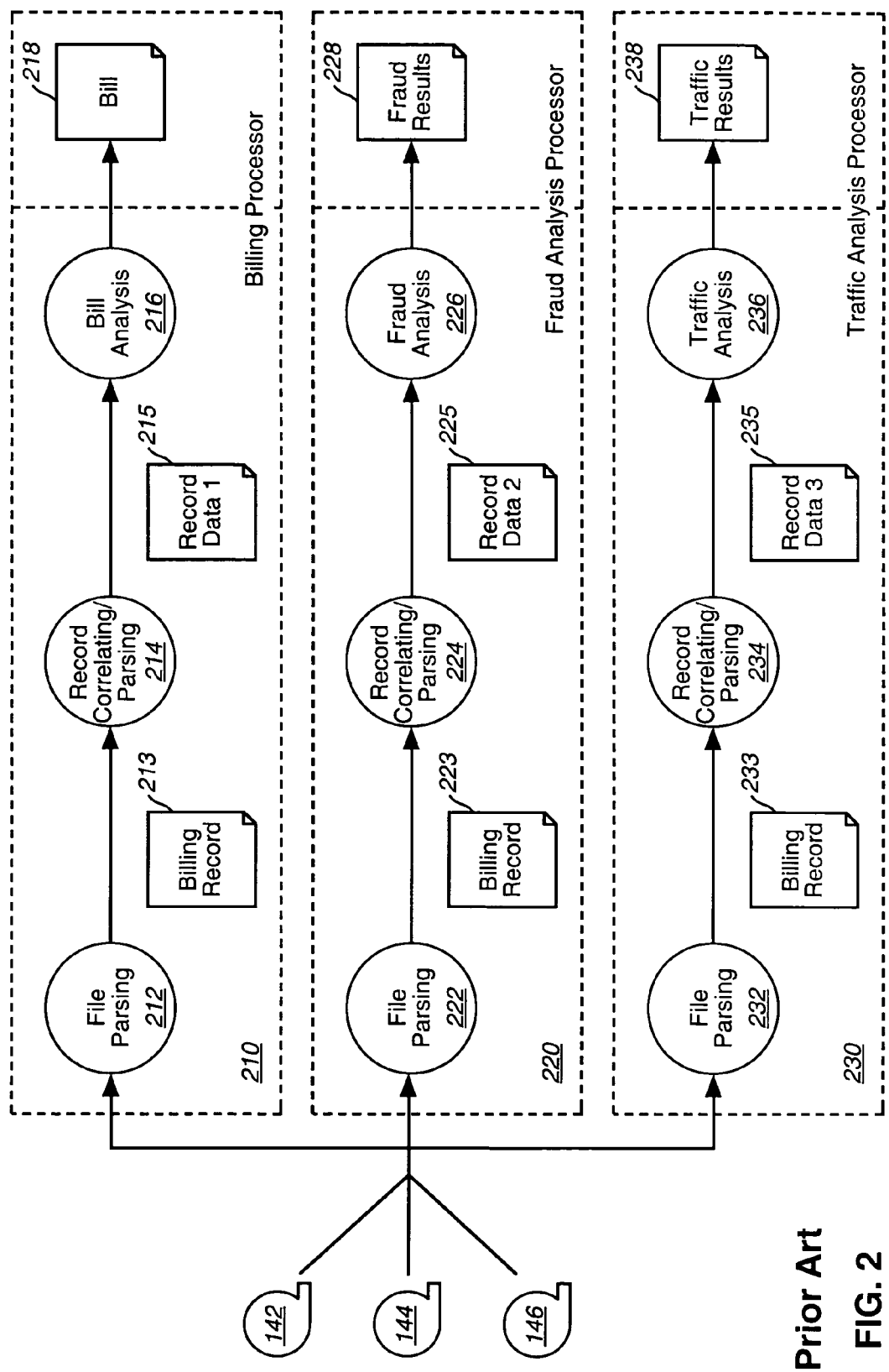
FIG. 2 is a diagram depicting how multiple post-processors handle call records according to the prior art.

FIG. 2 depicts the prior art approach to collecting and processing CDR files. In FIG. 2, CDR files 142, 144, and 146 that have been accumulated during call processing within network 100 are combined and submitted to various processing functions. A billing processing function 210 processes CDR files to derive billing for each subscriber who uses the network. The aggregated CDR files are first parsed by a file parsing stage 212 that yields separate billing records 213. Resulting parsed billing records are input to a record correlating/parsing function 214, that correlates CDR's and composes a description of each call handled by the network. This function is particularly important for matching up CDR's from multiple locations related to a given call. Record correlating/parsing function 214 may also screen for discrepancies among the CDR's. As a consistent description of each call is assembled from the CDR's, a record data instance 215 is output to a bill analysis function 216. Bill analysis function 216 reviews the billable aspects of each call, applies the appropriate billing rates to the recorded usage, and adds the charges to each subscriber's bill. The output of a bill analysis function 216 is a bill 218 for each subscriber.

A fraud analysis function 220 may similarly process the CDR files for the purpose of detecting fraud patterns, rather than calculating billing. The stages of file parsing 222 to yield billing records 223 and record correlating/parsing 224 to yield record data instance 225 are comparable to the functions within the billing processor function 210. The fraud analysis stage 226 reviews the progress of individual calls, as well as similarities among multiple calls that may indicate unusual activity. A report of fraud results 228 is generated to highlight any significant fraud-related findings from the processing of fraud analysis 226.

A traffic analysis function 230 may similarly process the CDR files for the purpose of optimizing the operation or design of the network. The stages of file parsing 232 to yield billing records 233 and record correlating/parsing 234 to yield record data instance 235 are comparable to the functions within the billing processor function 210. The traffic analysis stage 236 reviews usage patterns, such as the quantity and duration of calls in a given portion of the network, that may be useful for directing resource utilization within the network or for planning growth of the network. A report of traffic analysis results 238 is generated to summarize the findings of traffic analysis 236.

Billing processor 210, fraud analysis processor 220, and traffic analysis processor 230 are typically implemented in software to run upon a computer and are typically maintained separately from one another, perhaps even in different programming languages or upon different computing platforms. Any change in the syntax or semantics in the CDR's that are processed may necessitate changes and re-testing of all three of these software implementations.

Figure 3:
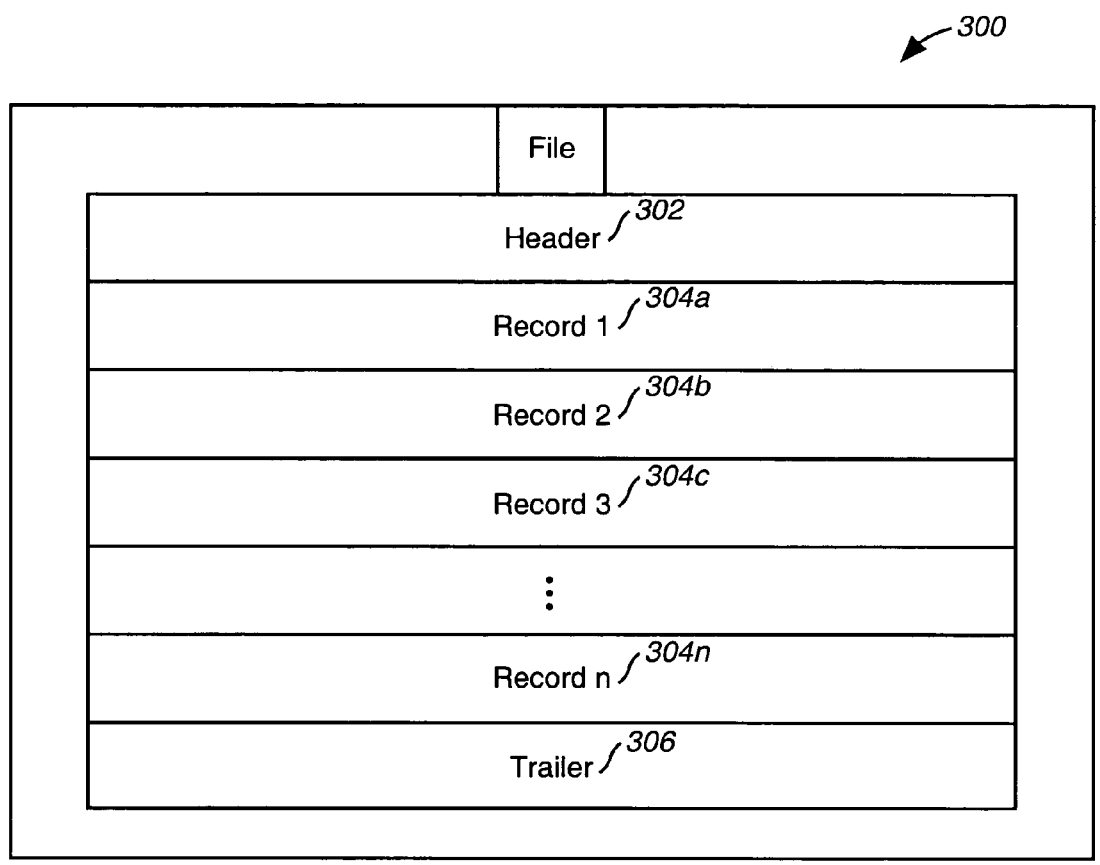
FIG. 3 is a diagram depicting the structure of a call detail record according to the prior art.

FIG. 3 shows the structure of a typical call detail record file 300 according to the prior art, comparable to CDR files 142, 144 and 146 mentioned above. CDR file 300 is essentially a concatenation of numerous fixed-length CDR's, depicted in FIG. 3 by records 304a-304d. CDR file 300 also includes a header 302 to provide general information about the file, such as the number of records in the file or the identity of the network element that generated the records. A trailer 306 may also be included to facilitate certain types of data processing or storage. Trailer 306 may, for example, contain a checksum derived from the CDR records that may be useful for checking the integrity of the data file. Records 304a-304d in call detail record file 300 merely contain data representing values such as phone numbers and feature groups. Prior art call detail record file 300 contains no expression of processing logic or instructions.

Figure 4:
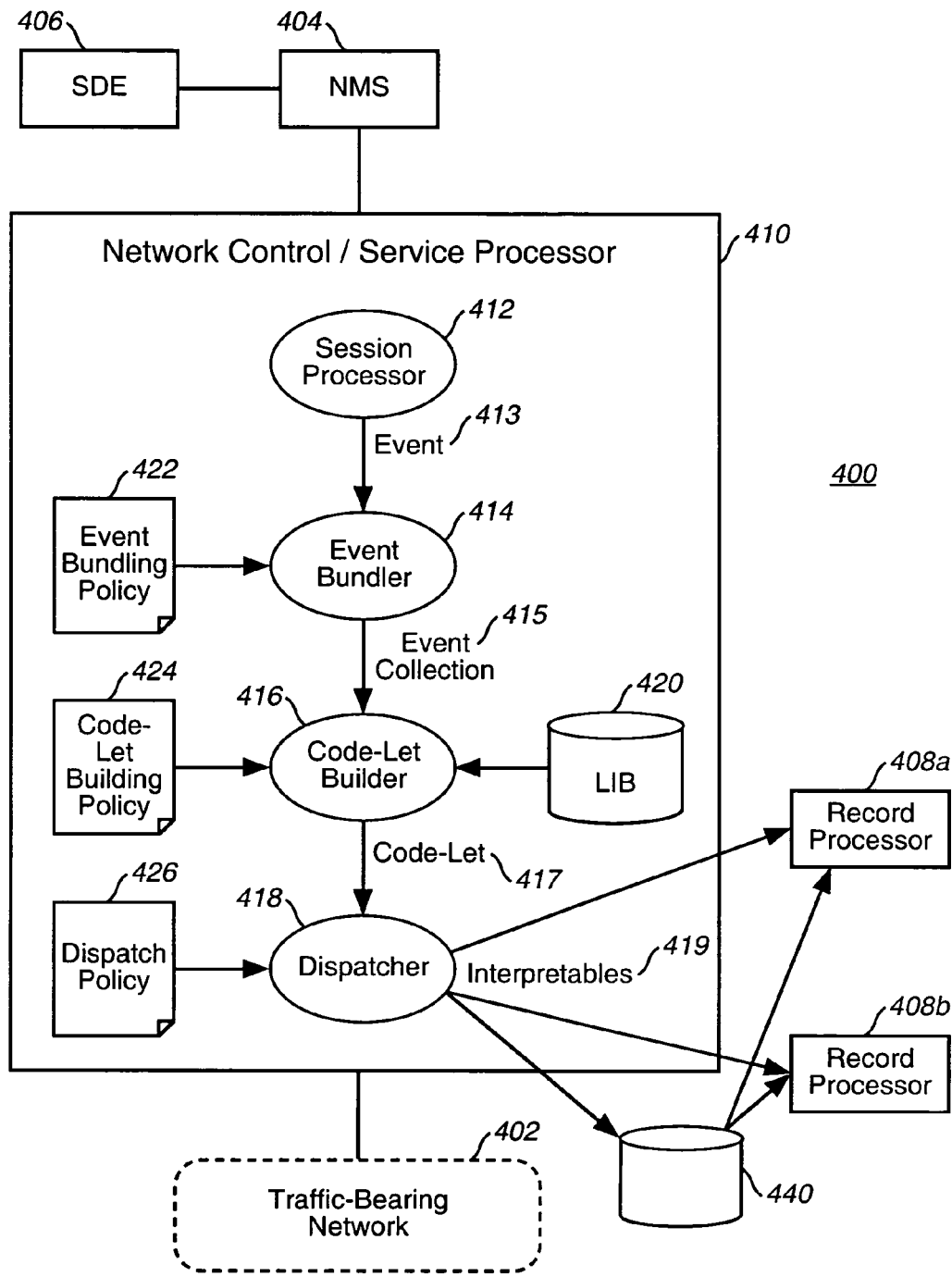
FIG. 4 is a functional block diagram of a system for performing service processing and service event record generation in accordance with a preferred exemplary embodiment of the present invention.

FIG. 4 depicts an exemplary embodiment of the present invention as implemented in a communications system 400. In particular, FIG. 4 shows how records are created and dispatched in the course of providing communications services.

Communications system 400 comprises a traffic-bearing network 402 and a network control/service processing function 410.

Traffic-bearing network 402 may be a telephone network, a packet-switched data network, frame relay, asynchronous transfer mode (ATM), or any other form of information transport and routing network. Traffic-bearing network 402 may even be a mixture of various transport types and may further comprise special resources such as voice response units or fax store-and-forward devices.

Network control/service processing function 410 coordinates the actions of equipment in traffic-bearing network 402. For example, in the case where communications system 400 is a telephone network, network control/service processing function 410 handles the call processing, such as call routing, typically performed by an intelligent network (IN) call processor in a traditional telephone network. Network control/service processing function 410 encompasses all processing required to provide services to subscribers, regardless of the transport technologies used in traffic-bearing network 402.

Within network control/service processing function 410, session processing function 412 represents the processing that determines how traffic-bearing network 402 is controlled to provide services in response to subscriber requests. Session processing function 412 is analogous to telephone call processing in a telephone network. However, session processing function 412 also comprehends support of data transport, multi-party communications, broadcast, multicast, bandwidth-on-demand, store-and-forward, gateway coordination, and other features beyond the scope of a traditional telephone network.

Session processing function 412 generates events 413 in the course of coordinating services. Session processing function 412 is implemented in software and run upon a computer. Part of the instructions that implement session processing function 412 determine when a processing step occurs that corresponds to a significant, perhaps billable, action that should be recorded.

For example, a telephone subscriber may access directory assistance and then ask for the call to be completed automatically for a small fee. As the session processing function 412 causes traffic-bearing network 402 to fulfill this request, the action is recorded as an event so that billing processing may append the charges to the subscriber's bill.

Not all events will have billing significance. Some events may simply record what transpired and prove useful for finding and eliminating problems in the network, or for observing-patterns of usage. The software instructions that implement the service processing function determine which actions shall generate events. Hence, the designer of the service processing software controls which events are eligible to be reported.

As shown in FIG. 4, events 413 generated in the course of service processing are accumulated by an event bundler 414. Event bundler 414 determines how to group events together, which events can be filtered out, and when a sufficient number of events have been accumulated to pass on to the next stage of processing in the form of an event collection 415. An event bundling policy 422 is a stored collection of rules or data that determines the behavior of event bundler 414.

To adjust the behavior or performance of event bundler 414, network engineers may arbitrarily establish rules within event bundling policy 422. As a result, for example, event bundler 414 may use the ending of a session as a trigger to bundle together all events related to the session. Otherwise, event bundler 414 may group events by resources used, by event types or by the identity of network elements involved in the events. As controlled by event bundling policy 422, event bundler 414 may also send forth groups of events representing partial or multiple sessions.

As shown in FIG. 4, event collections 415 created by event bundler 414 are subsequently processed by a code-let builder 416 to yield code-lets 417. Each code-let 417 comprises recorded event data along with code that expresses processing steps useful for interpreting the event data. Code-let builder 416 examines one or more received event collections 415 and adds executable code segments and additional data. In particular, code-let builder 416 may conditionally add selected data and instructions (executable code) depending upon what event types are present in event collections 415. Instructions to be added to the code-let may be derived from a library 420 containing code segments or may be dynamically constructed by code-let builder 416. Code-let builder 416 may combine data from multiple event collections 415 into a single code-let 417.

Figure 5:
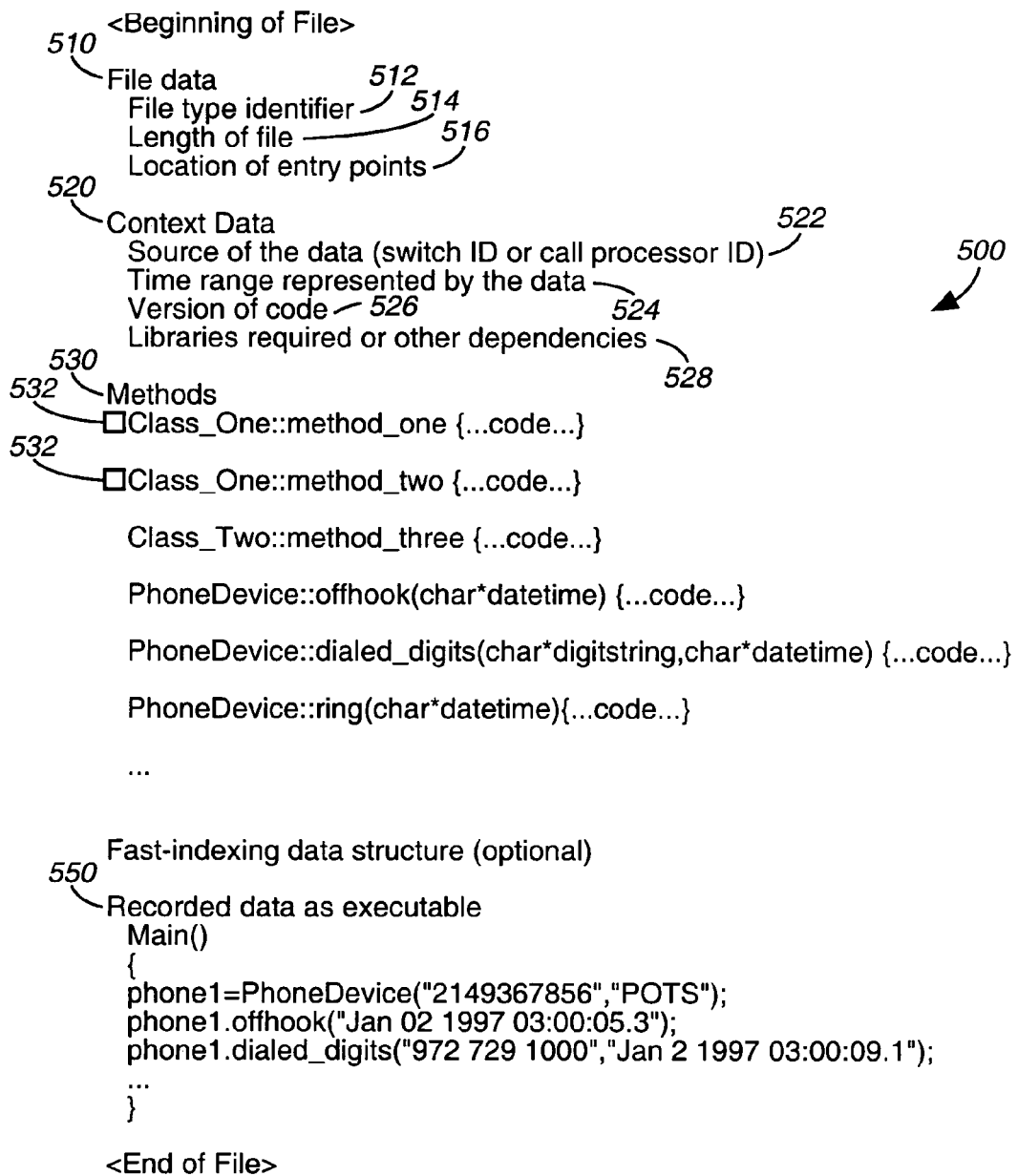
FIG. 5 is a pseudo-code listing depicting the structure of an interpretable service processing record in accordance with a preferred exemplary embodiment of the present invention.

The behavior of code-let builder 416 is determined by a stored code-let building policy 424 which may be arbitrarily established by network engineers. Code-let building policy 424 may be a data file containing rules and data that, for example, cause code-let builder 416 to combine multiple event collections into a single code-let 417. Code-let building policy 424 may also, for example, decide to include code segments from library 420 into code-let 417, or just references thereto. Code-let builder 416 may take into account the known availability of common library functions among the record processors that will ultimately receive the packaged data. Code-let builder 416 may determine that a new or updated function has been made available that none of the record processors have ever used before. Accordingly, the code-let handling policy function can ensure inclusion of the new function in the code-let so that the record processors can use the new function and perhaps store the function for future use. Furthermore, through code-let building policy 424, network engineers may explicitly designate new or updated functions to be uploading into the local libraries of record processors. This designation for each method or set of methods is depicted in FIG. 5 as upload indicator 532.

In a preferred embodiment of the present invention, code-let builder 416 endows each code-let 417 with sufficient data and methods so that a general-purpose processor can interpret the data contained therein and render a useful output, such as billing for subscribers. Thus, the control of how billing and other indirect processing takes place is implemented within the software instructions and function libraries within network control/service processor function 410. This means that billing and other indirect processing functions may be developed, tested, and deployed concomitantly with service processing features.

In a preferred embodiment of the present invention, code-lets 417 are created in the form of a generic executable such as JAVA byte-code so that various network control/service processors 410 and record processors 408a-b may be implemented on different computing platforms and yet be entirely compatible in creating and handling event records. Despite the exemplary reference to JAVA byte-code, persons of skill in the relevant art will recognize that many other varieties of generic executables may be employed, such as applets, servlets, JAVA BEANS, and serialized objects.

In FIG. 4, record processors 408a and 408b represent general-purpose processors that can interpret and execute the instructions and data that are generated in the course of service processing within communications system 400.

Dispatcher 418 receives each code-let 417 and creates a so-called "interpretable" 419 that may be sent to records processors 408a, 408b. As guided by stored instructions in dispatch policy 426, dispatcher 418 determines when and where to send each resulting interpretable 419. By adjusting settings within dispatch policy 426, a network engineer may cause dispatcher 418 to send interpretable 419 to a selected or preferred one of record processors 408a, 408b. Dispatcher 418 may also perform load balancing by sensing the instantaneous processing burdens among record processors 408a and 408b and deciding where to send each interpretable 419 accordingly. Dispatcher 418 may "meter out" interpretables 419 to a plurality of record processors. Dispatcher 418 may elect to send interpretables 419 to a storage area 440 rather than directly to any record processors. Dispatcher 418 may decide where to send each interpretable 419 based upon knowledge of library functions or special capabilities that differentiate each of the record processors 408a, 408b.

Any of the above actions by dispatcher 418 may be controlled or modified by the content of dispatch policy 426. Dispatcher 418 also determines the final form of interpretable 419.

In accordance with a preferred embodiment of the present invention, communications system 400 further comprises network management system (NMS) 404 and a service development environment (SDE) 406.

In part, network management system 404 serves the traditional role of monitoring the functional status of, and asserting control over, traffic-bearing network 402. In accordance with a preferred embodiment of the present invention, NMS 404 also is a means for distributing operating instructions or software to one or more network control/service processing functions 410 in communications system 400. One such means for distributing operating software and data to service processors is described in commonly assigned, U.S. patent application Ser. No. 09/128,937, filed Aug. 5, 1998, now U.S. Pat. No. 6,418,461, issued Jul. 9, 2002, and entitled "Intelligent Call Platform for an Intelligent Distributed Network Architecture", the whole contents and disclosure of which is incorporated by reference as if fully set forth herein.

Service processing and other functions, including billing processing and other such indirect processing functions, are created in a service development environment (SDE) 406. Upon satisfactory development and test, functions developed in SDE 406 are made available to NMS 404 to be distributed to the network. By the mechanism described previously, billing and other indirect processing functions are similarly developed and propagated via SDE 406 and NMS 404.

It is a noteworthy advantage in the present invention that many types of changes may be accommodated in this fashion without requiring any change in the record processor's software. Because the record processors mostly derive their function from the interpretable packages received, most of the common changes, such as adding of new billable features, may be readily made without changing the code of the record processors. In a preferred embodiment, record processors support JAVA or the like and the interpretables are packaged as such.

Only a change in the fundamental form of the executables, such as the manner of locating methods and data within the interpretable object, would necessarily impact the operation of the record processors. Changes to service processing features, event handling policies, code-let handling policies and dispatch policies would normally have no impact on record processor code except in the unlikely event that these changes also necessitate fundamental changes in the interpretable file format.

FIG. 5 depicts the typical content of an interpretable file that is dispatched to record processors in accordance with a preferred embodiment of the present invention. In FIG. 5, an interpretable file 500 is shown to comprise several sections. A file data header 510 includes general information about interpretable file 500, such as a file type identifier string 512, length of the file 514, and an entry point table 516 containing relative locations of sections or entry points within the file.

A methods section 530 within interpretable file 500 includes functions that may be directly executed by a record processor. In a preferred embodiment of the present invention, methods section 530 comprises compiled JAVA executable code segments. However, for clarity in FIG. 5, methods section 530 appears in a form similar to source code. Certain methods or sets of methods may be accompanied by an upload indicator 532 to designate those methods that should be uploaded and retained in the library of each record processor that eventually receives interpretable file 500.

A recorded data section 550 within interpretable file 500 includes method invocations representing actual events that occurred during service processing within a communications network. Some of the methods invoked in recorded data section 550 will be those included in section 530 of the interpretable file 500, whereas other methods may be obtained from libraries external to the interpretable. Each method invocation uses parameters applicable to the specific instance of a specific event or action. As will be described in detail below, when a record processor loads and executes the interpretable, the sequenced method invocations allow the record processor to reconstruct the events that occurred during service processing in the network and to perform useful processing based upon the reconstructed event.

For example, methods section 530 of interpretable file 500 may include a method called "Add_Party". This method may accepts a number of a new party to be added to an existing communications session, along with a time and date that the party was requested to be added. The adding of a new party to a communications session may entail additional charges to be billed to a subscriber. The "Add_Party" method contains the code for determining the appropriate charges to be added to a subscriber's bill.

As earlier described in conjunction with code-let building policy 424, the inclusion of a given method within a given interpretable may depend upon the need for the function. If an interpretable file contains the events of numerous sessions but none of the sessions involve the Add-Party function, then there is no need for interpretable file to include the Add-Party function. Also, if the add party function is commonplace, perhaps a standard library function, then the interpretable may not need to include the function but instead reference the function or a library that will be needed by a record processor.

Recorded data section 550 includes exactly one entry point in the code where processing is to begin, as represented by the main( ) statement in FIG. 5. All execution environments (e.g., operating systems, and interpreters) specify how to identify the starting point for their particular executable format (e.g., a "main" procedure in C/C++ and Java). The beginning of recorded data section 550 will be the starting point of execution after a general-purpose processor loads interpretable file 500 and then begins processing the contents. As will be described in detail later, the eventual processing of the interpretable by a general-purpose record processor entails the instantiation of objects, invocation of methods upon those objects, and interaction among the objects as is well known to those of skill in the art of object-oriented programming.

In summary, as a network user engages in a session of using the communications network, the events related to that session are recorded and assembled into an overall description within interpretable file 500. Events are expressed as method invocations in recorded data section 550 of interpretable file 500. Methods to be invoked during processing of interpretable file 500 may be self-contained within, and distributed to record processors via, interpretable file 500. An example of JAVA code in accordance with the above description of interpretable file 500 is shown for reference in Appendix A of this specification.

Figure 6:
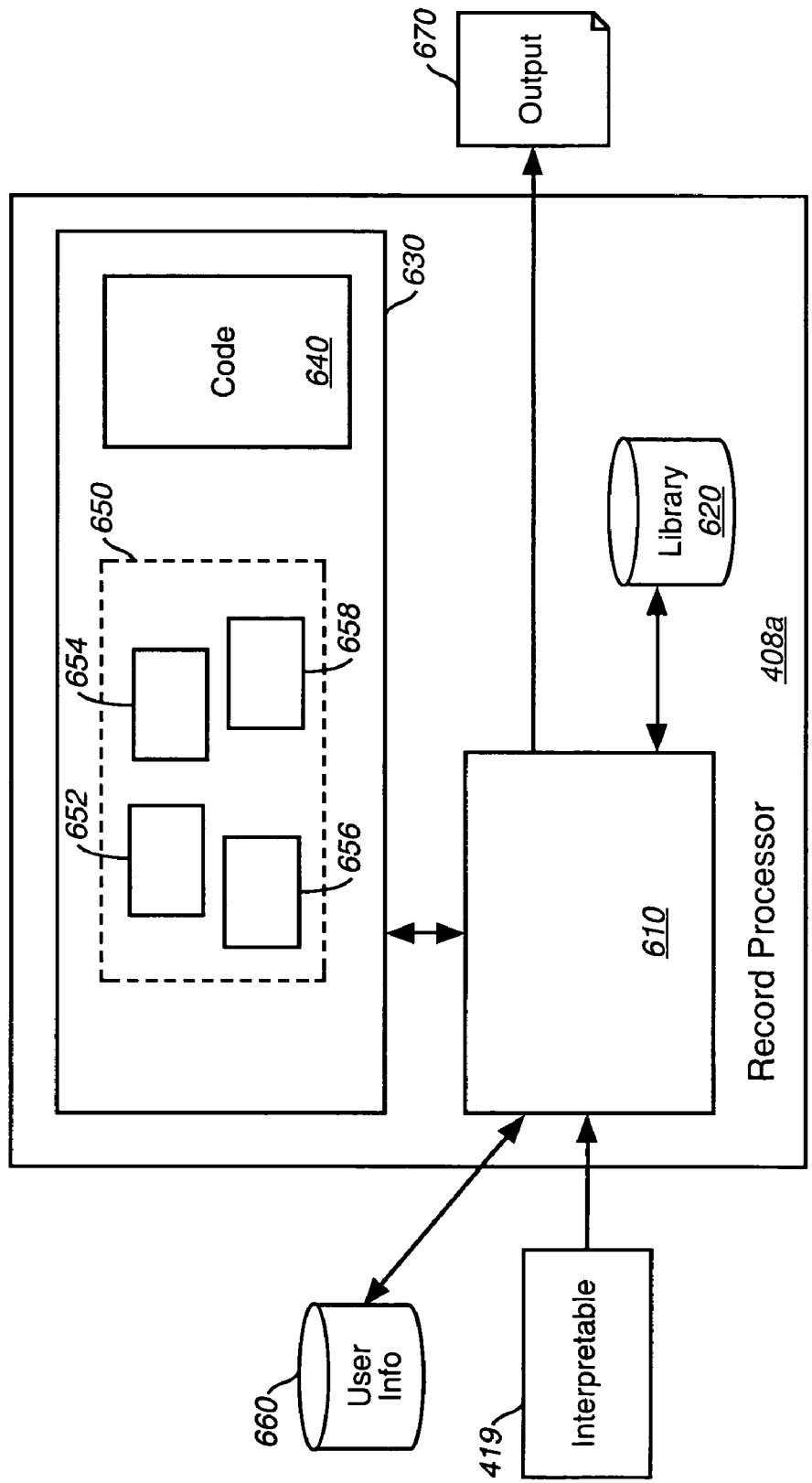
FIG. 6 is a block diagram describing the functioning of various components associated with general-purpose record processor in accordance with a preferred exemplary embodiment of the present invention.

FIG. 6 describes a record processor 600 equipped to receive and process interpretables in accordance with a preferred embodiment of the present invention.

In FIG. 6, interpretable 419 is received by record processor 408a and is loaded and executed in a manner similar to the way that a program is loaded and executed in a computer or an applet is loaded or executed by a hosting computer application, such as an Internet browser. More specifically, the contents of interpretable 419 are parsed and a read into the memory space 630 of record processor 408a by loader/interpreter 610. As code segments are found in interpretable 419 during parsing, these segments are copied into the memory space of the record processor as temporary code 640 and loader/interpreter 610 makes a temporary table that maps the name of the function to its address in memory. As references to library functions are encountered in interpretable file 419, loader/interpreter 610 copies into memory space 630 selected functions from local library 630 so that they are readily accessible during processing. This amounts to run-time binding of the local libraries.

As the interpreter 610 encounters a main entry point in interpretable 419, the processing of actual recorded network events begins. For example, a processing context in memory may effectively reconstruct the events and circumstances associated with a given communications session. Within a session reconstruction 650 in memory, as each function call representing an event is encountered in interpretable 419, object instances 652, 654, 656 and 658 are created and methods are invoked thereon to accomplish the processing intended by the code in interpretable 419.

Various object instances 652, 654, 656 and 658 may, for example, represent users, user equipment, switches, paths, call legs, services, or resources involved in a given session. Those skilled in the art of computer science and object-oriented programming are familiar with a variety of ways in which processing can occur in this fashion.

Record processor 408a may access an external or centralized database 660 to retrieve shared data such as the current account information for a given user. Record processor 408a may process transactions for a given user and then return the updated information to database 660. For example, record processor 408a may obtain a user's account and then append charges to the user's account information. Thus, charges will correctly accumulate to the user's account even though various sessions of usage may be handled by different record processors.

One significant advantage of putting coded functionality in interpretable 419 is the flexibility to include useful data structures such as hash tables and binary trees, and programming constructs such as looping, recursion, conditional branches, etc. In contrast, the call detail records of the prior art merely contained values.

Figure 7:
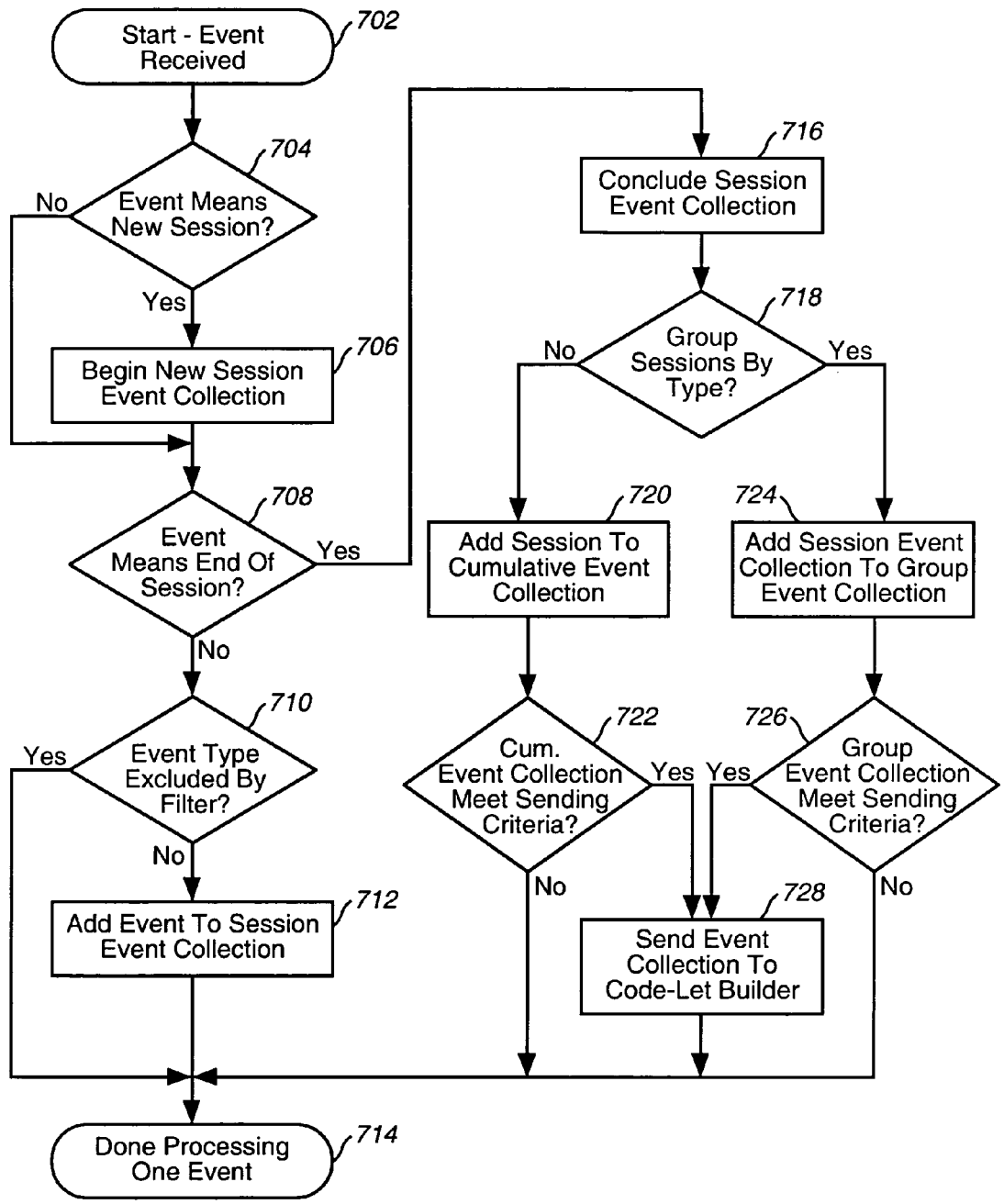
FIG. 7 is a flowchart describing the process by which an event bundler collects events generated during service processing.

With reference now to FIG. 7, a flowchart is shown to describe the processing steps performed by event bundler 414 in handling events 413 coming from session processor 412. The process begins at step 702 upon the receipt of an event 413 from session processor 702. The process depicted in FIG. 7 is therefore repeated for each such received event 413. Preferably, event bundler 414 maintains a persistent accumulation of events for each separate communications session engaged by session processor 412. Each such accumulation is referred to as a "session event collection" and preferably persists until the associated session is completed and terminated as determined by session processor 412. As will be readily understood by the skilled artisan, session processor 412 may provide some type of an indicator with each event 413 to identify an associated instance of a communications session. Event bundler 414 may use this indicator to properly associate incoming events 413 that are related to a particular communications sessions active in service processor 412.

Continuing at step 704, it is determined whether the event is related to an ongoing session or to a new session for which event bundler 414 has not already created a session event collection.

If the incoming event signifies a new session then, in step 706, a new session event collection is established. Otherwise, processing moves directly from step 704 to step 708.

In step 708, it is determined whether the incoming event signifies the end of a session. Upon conclusion of a session, session processor 412 may generate and send a terminal type of event that is recognized by event bundler 414. To summarize the remainder of the process, if the incoming event does not signify the conclusion of a session then the event is simply appended to an ongoing event collection associated with the session. Otherwise, event bundler 414 will determine how to group the finished event collection with other event collections and determine whether to send accumulated event collections to code-let builder 416.

If, in step 708, the event is determined not to signify the conclusion of a session, processing continues at decision step 710. At step 710, event bundler 414 performs according to settings within event bundling policy 424 that control what event types may be appended to a session event collection. As mentioned earlier, network engineers may use this means to limit the types of events in the collection. For example, some event messages may be useful only for diagnostic purposes and will not be used during post-processing. By changing the contents of event bundling policy 422, network engineers may dynamically cause the inclusion or exclusion of diagnostic event notifications in the event collection. Under normal circumstances, this filtering is applied to avoid extraneous content in the collection as will ultimately be sent to post-processors.

If, in step 710, the incoming event is not filtered by the current instructions implemented in event bundling policy 422, then the event is appended to the appropriate session event collection in step 712. Otherwise, step 712 is skipped and the processing of a single incoming event is concluded as represented by terminal step 714.

Referring back to step 708, if the incoming event does signify the end of its associated session, then processing resumes at step 716, wherein the session event collection is closed to further input and any required summary data about the collection is compiled and added to the collection. The summary data may comprise, for example, the number of events in the collection, a list of any special resources used, or software versions of the session processor or event bundler functions.

Continuing then to step 718, event bundler 414, guided by content within event bundling policy 422, determines whether event collections are to be grouped into aggregate collections based upon some common attribute of the event collections. For example, network engineers may decide to optimize performance by grouping together collections that relate to the use of a particular resource in traffic-bearing network 402.

If, in step 718, no criteria is to be used for grouping collections, then in step 720, the newly completed event collection is simply appended to a cumulative or aggregate collection. Following the addition of the single collection, the attributes of the cumulative collection are review in step 722 to determine if the cumulative collection is ready to be sent to code-let builder 416. The criteria for event bundler 414 to make this decision are determined by contents within event bundling policy 424. For example, event bundler 414 may send an aggregate collection whenever the aggregate grows to a certain overall size or when a time limit has elapsed since the previous transmittal of an aggregate from the event bundler. The latter may be done to reduce latency of processing small numbers of sessions when the network is relatively idle.

In step 722 then, if the criteria for transmitting the cumulative collection is met, the event collection is sent to code-let builder 416 and is preferably removed from the active memory of the processor that implements event bundler 414. Otherwise, in step 722, if the sending criteria is not met, then the cumulative collection is merely retained in memory for the time being and the processing of a single event is concluded as denoted by terminal step 714.

Figure 8:
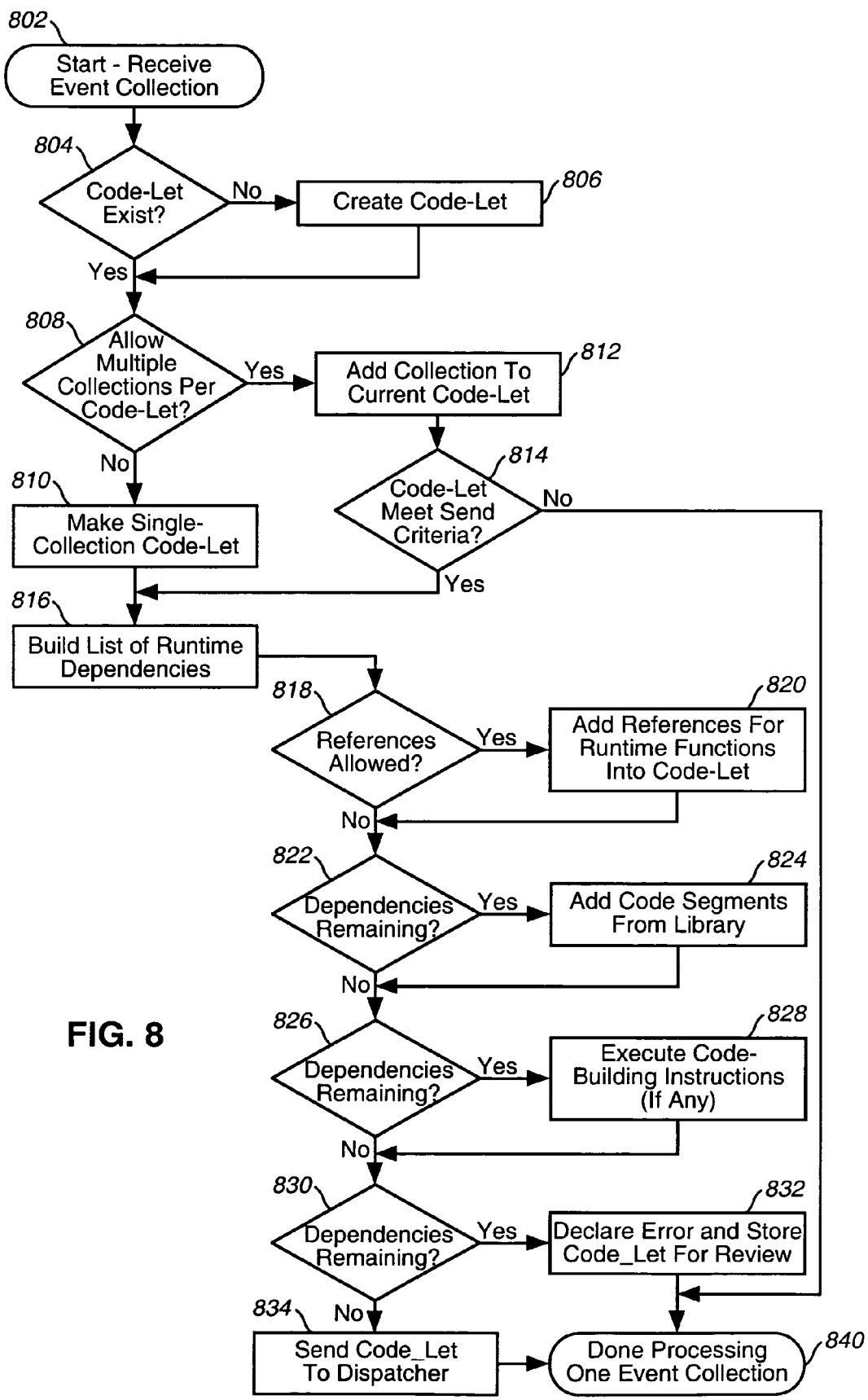
FIG. 8 is a flowchart describing the process by which a code-let builder adds methods and otherwise processes event collections to yield a code-let.

FIG. 8 of the drawings describes the process executed by code-let builder 416, whereby each event collection 415 is received from event bundler 414 and processed to yield a code-let 417.

The process of FIG. 8 begins at step 802 upon the receipt of a single event collection 415. Proceeding then directly to step 804, the code-let builder 416 decides whether a code-let already exists that is being assembled or whether the receipt of a new event collection should initiate a new code-let. If determined necessary in step 804, a code-let is created in step 806 before resuming execution at step 808. The code-let created in step 806 will serve as a container for one or more event collections.

Note that steps 804 and 806 are primarily useful where multiple event collections are included in a single code-let.

In step 808, code-let builder 416 determines whether it is permissible to place multiple event collections into a single code-let. This is affected by the contents of code-let building policy 424. For example, network engineers may decide to allow bundling of event collection into a code-let for reasons of efficiency. If such bundling is permitted, step 812 is executed to add the received event collection to the current code-let.

After adding the event collection, code-let builder 416 assesses, in step 814, whether the code-let meets criteria for concluding and sending the code-let. The code-let sending criteria are settings within code-let building policy 424. For example, network engineers may put content in code-let building policy 242 that cause the code-let builder to send a code-let whenever the code-let exceeds a certain size or number of event collections.

The send criteria may also take into account the resource types used within event collections within the code-let.

If, after adding an event collection to a code-let, the code-let still does not meet the sending criteria in step 814 then the process terminates at step 830 and neither the event collection nor the code-let are processed any further until a subsequent event collection is received.

Alternately, if the code-let is deemed in step 814 to meet the criteria for sending, then the code-let, which may include multiple event collections, is further processed beginning at step 816.

Referring back to step 808, if the formation of code-lets with multiple event collections is disallowed, then execution proceeds at step 810 wherein the single event collection received at step 802 is simply put into the code-let created in step 806. Thereafter the new code-let is further processed beginning at step 816.

The remainder of the processing steps in FIG. 8 augment the code-let as needed with functional pieces that will be required later by a post-processor. These functional pieces correspond to methods 530 earlier described in conjunction with FIG. 5.

In step 816, a list of dependencies is constructed representing all the processing methods and any other functional pieces that will be needed at runtime based upon the event types included in the code-let. For example, if even one of the event collections within the code-let includes an event involving reversal of charges to a called party, then certain functions must be available at runtime for a post-processor to correctly handle the event and process any sessions that include the event.

Some frequently used or very basic functions may permanently reside in the post-processors as indicated by library 620 in FIG. 6. With some knowledge of what functions are commonly available to post-processors, code-let builder can abstain from duplicating those runtime functions in the code-let. Accordingly, step 818 refers to determining whether references can be substituted for actual runtime functions to reduce the size of the code-let. In step 818, code-let builder 416 is directed by code-let building policy 424 as to whether references are allowed to replace actual runtime functions. Network engineers may adjust the content of code-let building policy 424 to cause the code-let builder to use references to runtime functions for the purpose of minimizing code-let size. Otherwise, network engineers may want some or all of the required functions explicitly included in each code-let to assure that all post-processors that ultimately receive the code-let have all the required functionality intact. This may be a necessity if the capabilities of the target post-processors are undetermined when the code-let is built.

If processing step 818 finds that references in the code-let are allowable, then at step 820 the appropriate references are placed into the methods section of the code-let for each of the functions that can be represented by reference. Such references may specify a library name and function call name, for example.

Additionally, for each function replaced by reference in step 820, the list of runtime dependencies is updated, removing the functions that have now been adequately included in the code-let by reference.

Whether or not functions may be replaced by references, processing of the code-let continues at step 822 wherein the list of dependencies derived in step 816 is examined for any remaining dependencies. If there are further runtime dependencies that must be addressed, then step 824 is executed to add needed functions to the methods section of the code-let.

These functions may, for example, be obtained from local function library 420 shown in FIG. 4. All functions that are included in the code-let by step 824 are deducted from the list of dependencies derived in step 816.

Then, in step 826, the list of dependencies is again examined to see if any more functions are required that have not been included explicitly or by reference. If there are more functions that need to be included then, in step 828, the code-let bundling policy is consulted to find instructions available to for dynamically building the required functionality within code-let builder 416. Any functions that are dynamically constructed and included in the code-let are then deducted from the dependency list and processing resumes at step 830.

At step 830, a final assessment of dependencies is made. If there are any remaining unresolved dependencies, then the code-let builder declares an error situation in step 832 and sets aside the code-let so that network engineers can troubleshoot the cause of the error. Processing of the received event collection thus terminates at step 840.

Otherwise, if, by step 830, all runtime function dependencies have, been resolved, then the completed code-let is passed on to dispatcher 418 in step 834 and processing of the received event collection is concluded at terminal step 840.

Figure 9:
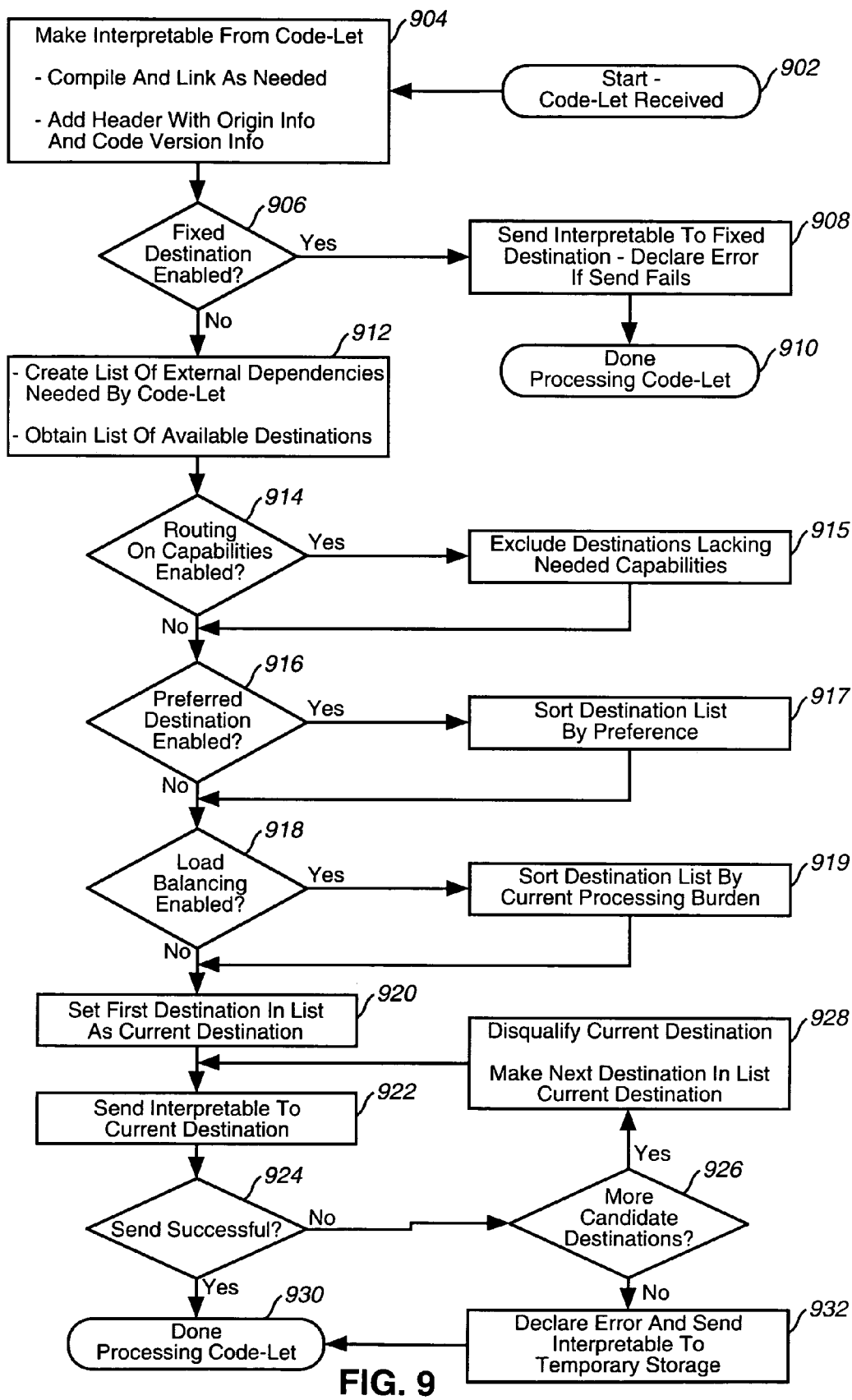
FIG. 9 is a flowchart describing the process for transforming a code-let into an interpretable.

FIG. 9 describes the processing steps performed by dispatcher 418 in receiving code-lets 415 from code-let builder 416 and sending complete executables or "interpretables" 419 to record processors 408 or to temporary data repositories 440.

The process of FIG. 9 begins at step 902 upon the receipt of a code-let and continues immediately to step 904.

In step 904, the code-let is transformed into a self-contained interpretable by compiling and linking (if necessary) the code accumulated in the code-let and by adding header information to the executable file corresponding to header section 510 in FIG. 5. In one variation, the received code-let may comprise functions in a form similar to human-readable source code. This source code may need to be compiled into some form of directly executable machine-instructions and references to functions will need to be resolved by linking, as is commonly understood by persons skilled in computer programming. In another variation, the code-let may comprise functions as pre-compiled segments that merely need to be included and linked in the interpretable. In a third variation, functions may be passed along in the interpretable in the form similar to source code to be interpreted at runtime by record processors downstream.

In a preferred embodiment, the interpretable comprises functions in the form of compiled JAVA byte code and the record processors are capable of directly executing interpretable as such.

In step 904, a compressed or encrypted version of the interpretable may also be generated to improve the efficiency and security of the interpretable as it is transmitted and stored.

Next, in step 906, the dispatch policy 426 is consulted to determine if the destination for the interpretable is fixed. In some circumstances, network engineers may desire to force all interpretables to be sent to a particular record processor.

If this is the case, then, in step 908, an attempt is made to send the interpretable to the designated record processor or storage repository. An error is declared if this attempt to send fails. The process then terminates at step 910 as there are no alternate destinations or dispositions allowed.

Returning to step 906, if the destination for the interpretable is not fixed within dispatch policy 424, then execution proceeds to step 912. In step 912, two lists are generated. One is a list of all destinations, such as record processors and repositories, currently available to the dispatcher. The other is a list of external dependencies for the code-let. For example, the code-let builder may assume that certain libraries will be available at runtime and may elect to merely reference the functions as indicated by steps 818-820 in FIG. 8. External dependencies may be data or functions that the code-let builder assumes will be present in a post-processing runtime environment.

If not all record processors have the assumed runtime functions, the steps 912,914, and 915 assure that the interpretable is dispatched only to a record processor that does have the required runtime functions in a local library, such as library 620 shown in FIG. 6.

After lists are generated in step 912, step 914 is executed to determine if routing based upon capabilities of each destination is allowed. This decision is determined by the contents of dispatch policy 426. The capabilities of each destination may include, for example, runtime libraries available, processing or storage capacity, or availability of special resources at the destination. Network engineers may desire to disable routing by capabilities in order to perform troubleshooting or to coordinate the deployment of new library functions as will be described later in conjunction with step 1008 of FIG. 10.

If routing on capabilities is permitted, then step 915 is executed whereby destinations that do not have required capabilities to handle the interpretable are eliminated from the list of candidate destinations that was derived in step 912.

Next, in step 916, the dispatch policy is consulted to determine if routing of the interpretable to a destination can take into account a preference order among the candidate destinations. If so, then step 917 is executed to sort the list of candidates based upon a preference that is also contained dispatch policy 426. Network engineers may use this capability to enable preferential "homing" of specific service processors to specific record processors. This preference may be based upon static load balancing or upon proximity between service processor and record processor, for example.

In step 918, the dispatch policy is consulted to determine if dynamic load balancing is enabled. If so, then step 919 is executed to further sort the list of candidate destinations according to their current processing burdens. The current processing burden for each destination record processor may be relayed to the dispatcher through a network management system for example. Although it is not explicitly shown, the means for accomplishing this will be readily understood by a person of ordinary skill in communications networks.

Upon reaching step 920 then, the candidate list of destinations derived in step 912 has been filtered and sorted as needed according to the instructions in dispatch policy 426. Step 920 simply involves selecting the topmost entry in the list of destinations as an initial context for the processing loop formed by steps 922, 924, 926, and 928.

In step 922, an attempt is made to send the current interpretable that was built in step 904 to the current candidate destination, which, for the first iteration of step 922, was identified in step 920.

In step 924, if the attempted send of step 922 is successful then processing of the code-let and dispatching of the corresponding interpretable is completed as indicated by terminal step 930.

Otherwise, if step 924 indicates that the dispatch was unsuccessful, then processing moves to step 926 to find other candidate destinations. If step 926 finds that no other candidate destinations remain in the list, then an error is declared in step 932, the interpretable is sent to a temporary storage area, and the processing terminates at step 930.

While step 926 does find additional untried destinations in the candidate destination list, then processing continues at step 928 wherein the previously tried candidate is eliminated from the list and the next candidate destination on the list becomes the current destination. As shown, steps 922 and 924 are then repeated for the new current destination. Simply put, the loop comprising steps 922, 924, 926 and 928 is repeated until either the interpretable is successfully sent to a destination or the list of destinations is exhausted. Persons of ordinary skill in the art will appreciate that there are several ways to accomplish and verify transmission of an interpretable to a destination.

Figure 10:
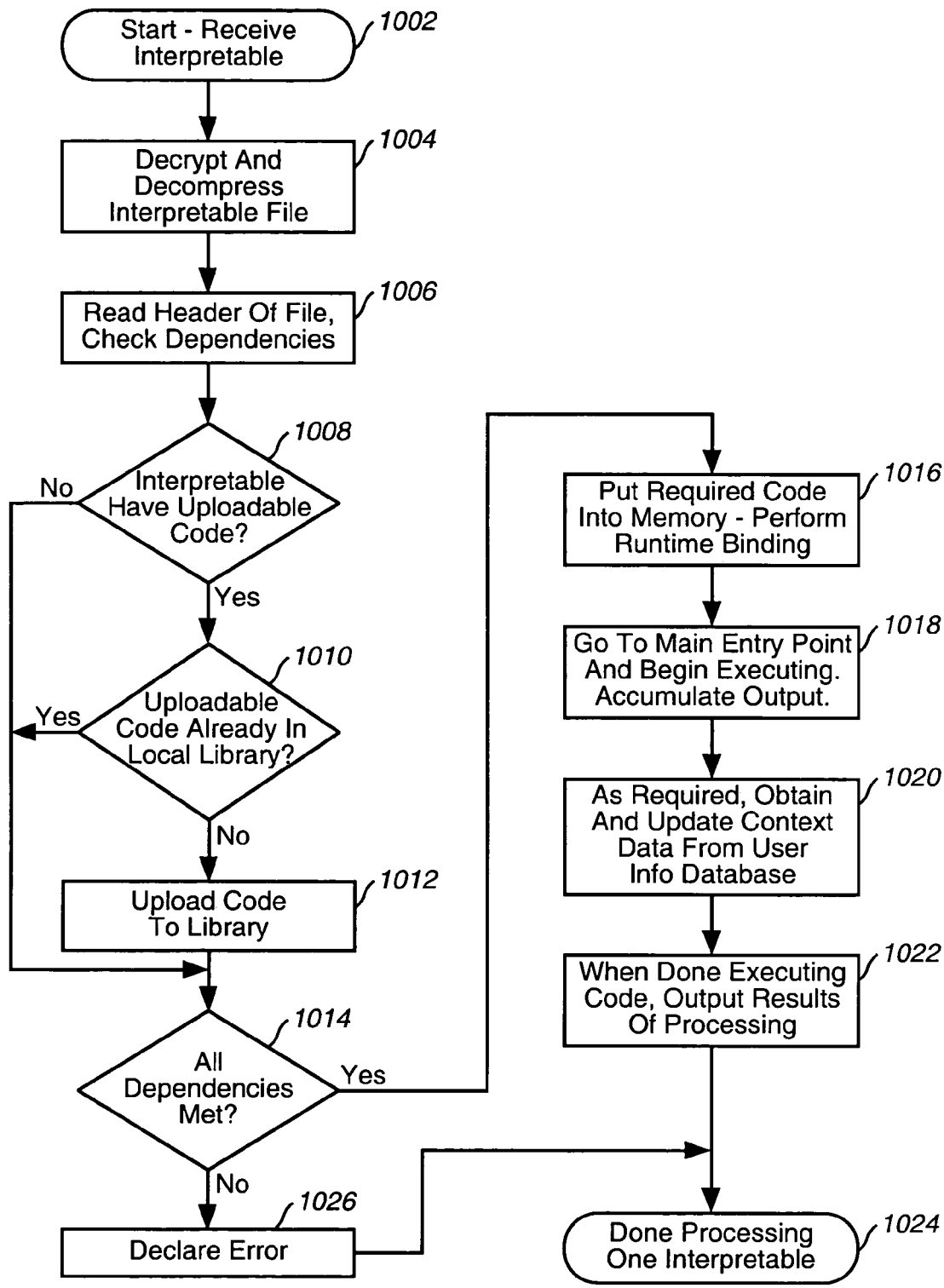
FIG. 10 is a flowchart describing the process by which a general-purpose record processor receives and process an interpretable.

FIG. 10 describes the process steps performed by a record processor upon receipt of an interpretable that has been generated by a service processor in accordance with a preferred embodiment of the present invention. It will be particularly helpful to refer to both FIG. 6 and FIG. 10 in conjunction with the following description. Most of the process steps in FIG. 10 are executed or coordinated by loader/interpreter 610 in FIG. 6.

The process of FIG. 10 begins at step 1002 as an interpretable is received. Then, in step 1004, the interpretable file is decrypted and decompressed, if necessary, to yield an interpretable ready to be loaded into the processing environment. Next, in step 1006, the header information in the interpretable is read to determine the dependencies that will be needed during processing of the interpretable.

In step 1008, the portion of the interpretable that contains methods, corresponding to methods section 530 in FIG. 5, is examined for methods that are designated to be uploaded from the interpretable into the library of the record processor. As previously described in conjunction with code-let building policy 424 in FIG. 4, network engineers may designate selected methods to be uploaded into the libraries of record processors, especially when new methods are being deployed that are expected to be see widespread and frequent use.

In step 1008, a designation, such as an upload indicator 532 in FIG. 5, is reviewed for each method or set of methods in the received interpretable to determine if any methods in the interpretable should be uploaded and retained in the library of the record processor. If not, then processing continues with step 1014 to be described below. Otherwise, then step 1010 is executed to determine if the designated uploadable methods are already in the library. If the uploadable methods are already present in the library, then processing continues with step 1014 to be described below. Otherwise, the designated methods are uploaded and persistently stored in the record processor library.

As will be recognized by those of skill in the art, this process automatically updates the record processor library and may be complemented with a maintenance process that occasionally removes unused or infrequently used functions and data from the record processor library.

Furthermore, those of skill in the art will recognize that the uploading of methods from the interpretable into the record processor library may also be controlled or inherently accomplished by executing code in the interpretable. In other words, briefly referring back to FIG. 5, certain methods invocations within the recorded data section 550 of interpretable file 500 may carry out the checking of library contents and the uploading of selected methods into the record processor library when the interpretable file is executed by a record processor.

In step 1014, the record processor, and particularly the local library of the record processor, is examined to see if all dependencies are present. If, in step 1014, it is determined that there are some dependencies not already present in the record processors, then in step 1010, the interpretable is examined to see if the missing dependencies are self-contained. If not, then an error is declared in step 1026 and processing of the interpretable ends in terminal step 1024.

Otherwise, when all needed elements are determined to be available to the record processor, then step 1016 is executed wherein the methods included as functions or libraries in the interpretable are read into runtime environment, namely as code 640 in memory space 630 as shown in FIG. 6. As described earlier, functions from library 620 may also be brought into memory space 630 as needed to support execution of the interpretable. As library functions are placed into memory space 620, loader/interpreter 610 builds a temporary table mapping function names to memory addresses representing the entry point of each function instantiated in memory. This allows finding the correct memory location to jump to as each function is invoked. Those of skill in the art will recognize this as customary process known as runtime binding.

Referring again to FIG. 10, in step 1010 loader/interpreter 610 locates the main entry point of the interpretable as it has been deployed into memory space 630. Execution of the interpretable then proceeds. As described earlier in conjunction with FIG. 6, the instructions in the interpretable will then typically cause a session reconstruction space 650 to be created within the memory space 630 and various service-related and event-related objects to be instantiated therein. The output created by the execution of the interpretable is accumulated by within the record processor until the execution of the interpretable is completed. The execution of the interpretable may also cause data to be written to context info storage 660. For example, if the record processor is running an interpretable resulting from a toll telephone call session, then the output file may be a bill or report for a subscriber and context info storage 660 may store an account record containing the running balance of the subscriber's account.

As indicated in step 1020, records from context info storage 660 may be retrieved and updated as needed during execution of the interpretable.

When, in step 1022, the execution of the interpretable is finished, the result of the execution are output as a file or printed report represented by output 670. Processing of a single interpretable is then concluded as signified by terminal step 1024.

Figure 11:
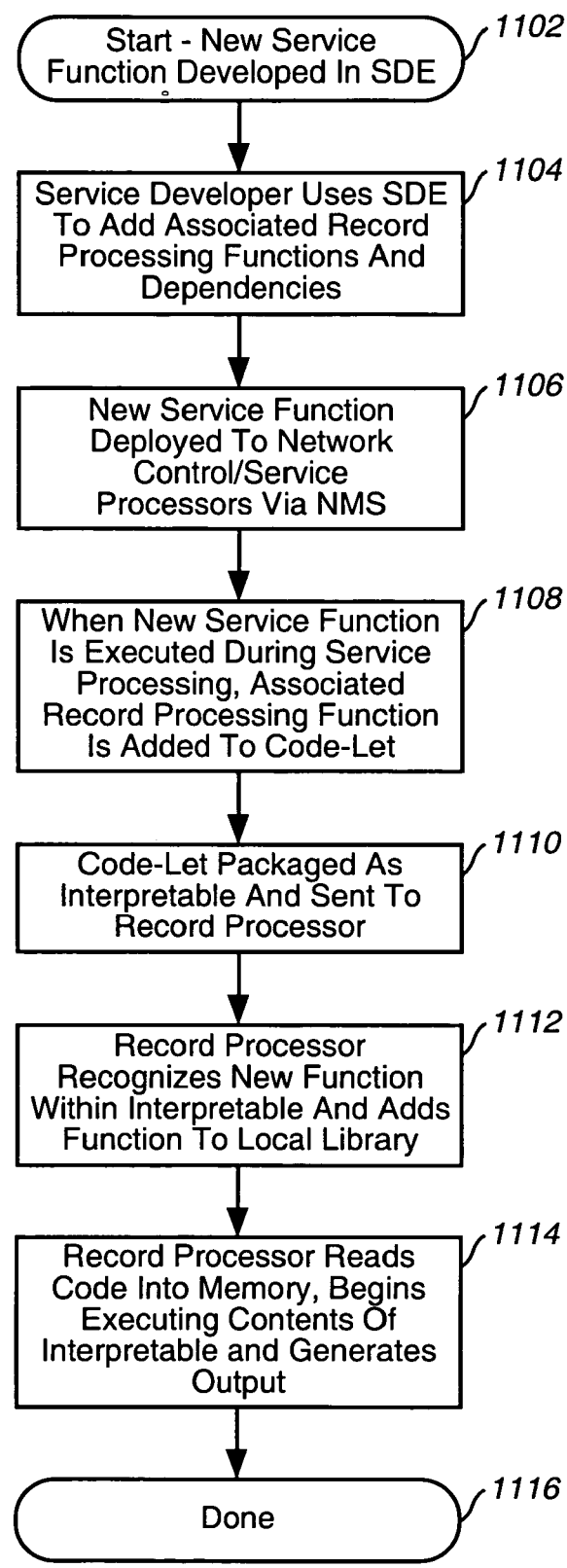
FIG. 11 is a flowchart depicting the overall process for developing, deploying, and executing record processing functionality in accordance with a preferred exemplary embodiment of the present invention.

FIG. 11 describes the overall steps that are performed in the creation, deployment and execution of service functionality in accordance with a preferred embodiment of the present invention. It will be useful to refer to both FIG. 11 and FIG. 4 in conjunction with the following description.

The process of FIG. 11 begins in step 1102 when a new service has been developed in service development environment (SDE) 406.

In step 1104, a service developer performs further operations within SDE 406 to assign dependencies to the newly developed service functions. Preferably, code dependencies will be automatically included whereas data resources will probably have to be identified explicitly by the service developer.

In step 1106, copies of the completed new service function are distributed to the many network control/service processors 410 in network 400 via NMS 404. In particular, the new service function will likely appear in session processor 412 and library 420.

In step 1108, sometime after the new service function has been deployed, the new service function is accessed in the course service processing and session processor 412 generates a corresponding event 413. Eventually, code-let builder 416 will find the presence of the event in the code-let and add the corresponding record processing function from library 420. This record processing function was likely added to the library upon initial service deployment in step 1106.

In step 1110, the code-let is packaged as an interpretable and dispatched to a record processor as described in detail earlier.

In step 1112, the record processor that receives the interpretable recognizes new functionality not already contained in its local library. By the process described in FIG. 10, the record processor may automatically recognize and retain the new service function for subsequent interpretables. Furthermore, as described earlier, the record processor may communicate through some means to code-let builders to indicate that the new function is now included in the record processor library and that the code-builder may merely include references to the function until further notice.

In step 1114, the record processor reads the interpretable, begins executing its contents, and generates output by the process described in FIG. 11.

Finally, in step 1116, the process is concluded of deploying and using a new record processing function delivered via an interpretable issued from a service processor.

While the present invention has been described herein in the context of an exemplary embodiment, those of ordinary skill in the art will recognize that many variations may be made upon what has been shown and described without deviating from the scope and spirit of the present invention. None of the aspects of the exemplary embodiment shown and described should be construed to limit the present invention. The scope of the present invention should instead be interpreted from the claims that follow.

What is claimed is:

1. A record processor for processing an interpretable file generated by a communications system, the interpretable file comprising at least one recorded service processing event representing service processing activity that has transpired in the communications system and comprising at least one instruction for processing the recorded service processing event, the record processor comprising:
   at least one general-purpose processing environment comprising at least one memory space; and
   at least one interpreter that receives and parses an interpretable file generated by a communications system, loads the instruction into the memory space, and processes the recorded service processing event in the interpretable file by executing the instruction loaded in the general-purpose processing environment.

2. The record processor of claim 1 further comprising a persistently stored library of instructions and data needed for processing the recorded service processing event.

3. The record processor of claim 2 wherein the instruction obtained from the interpretable file is uploaded into the persistently stored library.

4. The record processor of claim 2 wherein the instruction is selectively uploaded into the persistently stored library responsive to an indicator within the interpretable file.

5. A record processor for processing an executable file created by a communications system to represent at least one service processing event indicating service processing activity that has occurred in the communications system, the record processor comprising a general-purpose execution environment into which the executable file is loaded and executed to accomplish processing of the service processing event.

6. A method for processing of an executable file created by a communications network in the course of service processing, wherein the executable file comprises at least one service processing event and at least one instruction for processing the service processing event, the method comprising:
   receiving the executable file from the communications network;
   loading the executable file into an execution environment; and
   executing the executable file to accomplish processing of the service processing event using the instruction.

7. A record processor coupled to a communications network for processing an interpretable file generated by the communications network, the interpretable file comprising at least one service processing event recorded during service processing of the communications network and at least one instruction for processing the service processing event, the record processor comprising:
   at least one general-purpose processing environment comprising at least one memory space; and
   at least one interpreter coupled to the processing environment, wherein the interpreter receives and parses the interpretable file, loads the instruction into the memory space, and processes the service processing event in the interpretable file by executing the instruction loaded in the memory space.

8. The record processor of claim 7 further comprising a persistently stored library coupled to the interpreter, wherein the library is a repository for retaining the instruction whereby the instruction may be retrieved as needed for subsequent processing of service processing events.

9. The record processor of claim 8 wherein the instruction obtained from the interpretable file is uploaded into the library.

10. The record processor of claim 8 wherein the instruction is selectively uploaded into the library responsive to an indicator within the interpretable file.

11. A method for processing an event record created by a communications network in the course of performing service processing, wherein the event record comprises at least one service processing event and at least one instruction for processing the service processing event, the method comprising:
   receiving the event record from the communications network;
   loading the instruction from the event record into an execution environment; and
   executing the instruction to accomplish processing of the service processing event.

12. A method, in a record processor including a storage and wherein the record processor processes a recorded service processing event from a communications network, for obtaining an instruction for processing of the service processing event, the method comprising:
   receiving from the communications network an interpretable file comprising the instruction for processing the service processing event;
   extracting the instruction from the interpretable file;

storing the instruction in the storage of the record processor;

retrieving the instruction from the storage of the record processor; and applying the instruction to process the service processing event.

13. A method of processing a record of events recorded during use of a communications network comprising:

generating a plurality of event records;

bundling one or more of said plurality of event records according to a policy to create an event collection;

generating an interpretable file comprising at least one instruction for processing at least one of the event records;

receiving the interpretable file at a service processor;

extracting the instructions from the interpretable file;

storing the instructions in a storage in the record processor;

retrieving the instructions from the storage of the record processor; and applying the instructions to process the recorded events.

14. A method according to claim 13 wherein said step of generating an interpretable file comprises:

receiving the event collection at a code-let builder; and generating a code-let comprising at least one instruction for processing at least one of the event records.

15. A method of processing a record of one or more events recorded during use of a communications network comprising:

generating an event record;

generating an interpretable file comprising at least one instruction for processing the event record;

receiving the interpretable file at a service processor;

extracting the instruction from the interpretable file;

storing the instruction in a storage in the record processor;

retrieving the instruction from the storage of the record processor; and applying the instruction to process the event record.

16. A method according to claim 15 wherein said step of generating an interpretable file comprises:

receiving the event record at a code-let builder; and generating a code-let comprising at least one instruction for processing the event record.

17. A service processor for controlling a communications network to provide services to users coupled to the network, the service processor comprising:

at least one session processor that executes service logic related to at least one communication session and that generates at least one session processing event record pertaining to the communication session; and at least one code-let builder that builds a code-let comprising the session processing event record and at least one instruction pertaining to how the session processing event record is to be processed by a record processor.

18. The service processor of claim 17 further comprising:

at least one dispatcher for sending the code-let to the record processor as an interpretable file.

19. The service processor of claim 17 further comprising:

at least one event bundler coupled to the session processor that receives the session processing event record and provides a collection of event records, including the session processing event record, to the code-let builder.

20. A method for providing service processing records from a communication service processor to a record processor comprising:

receiving at least one service processing record from the communication service processor, the service processing record relating to an action that has been performed by the communication service processor;

receiving at least one instruction from the communication service processor pertaining to how the service processing record is to be processed by the record processor; and sending to the record processor, to service processing record and to instruction.

* * * * *